Dec. 29, 1925.
E. H. BELDEN
MOTOR VEHICLE
Filed August 26, 1920
1,567,899
2 Sheets-Sheet 1
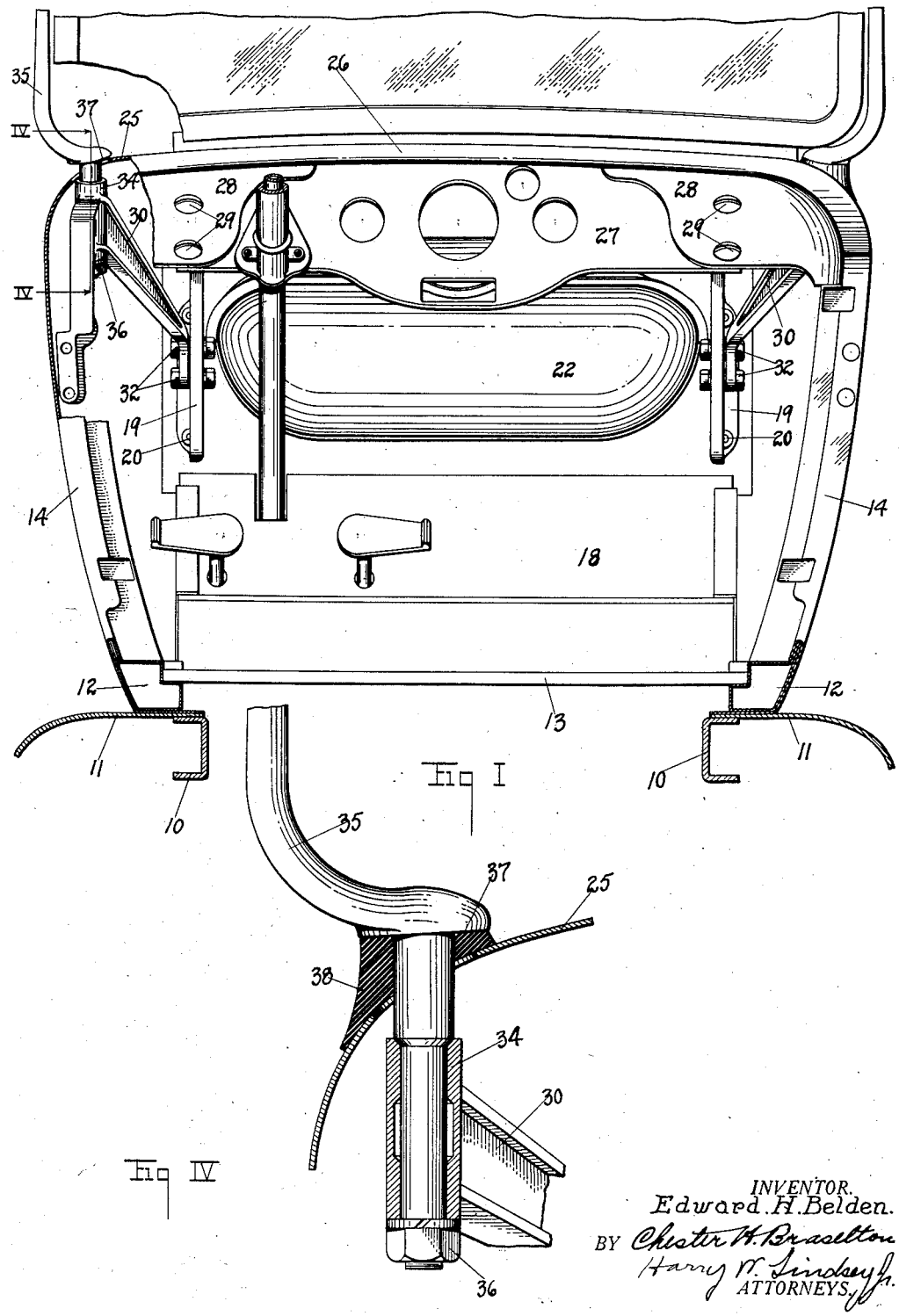
INVENTOR.
Edward H. Belden.
BY Chester H. Braselton
Harry W. Lindsey Jr.
ATTORNEYS.

Dec. 29, 1925.
E. H. BELDEN
1,567,899
MOTOR VEHICLE
Filed August 26, 1920   2 Sheets-Sheet 2
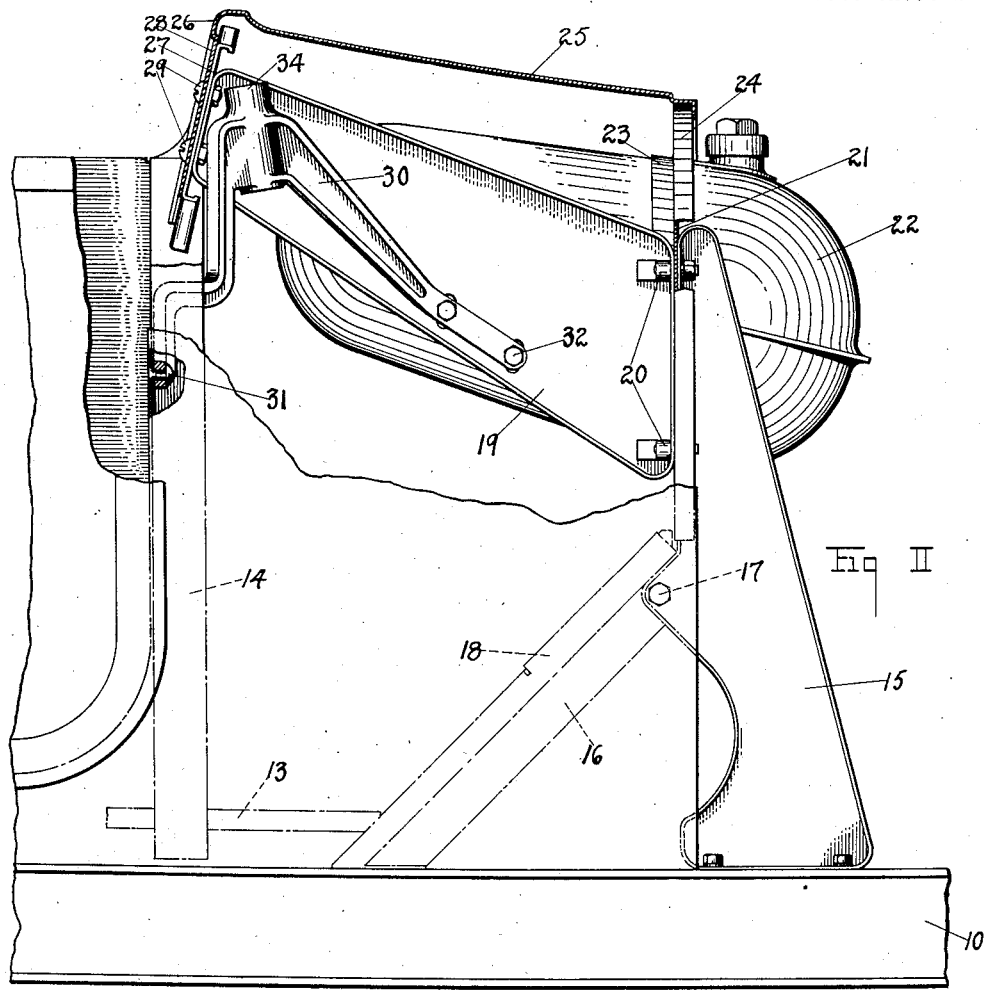
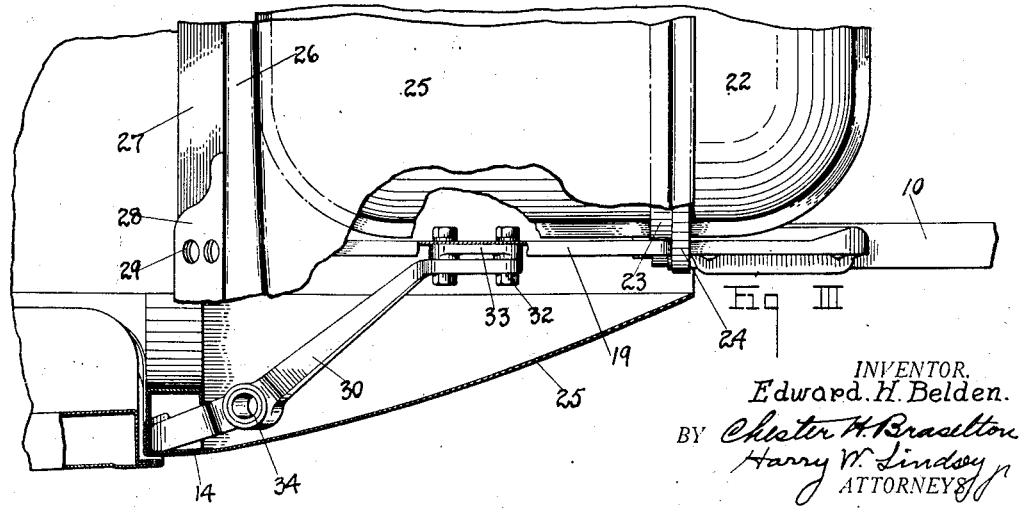
INVENTOR.
Edward. H. Belden.
BY Chester H. Braselton
Harry W. Lindsey
ATTORNEYS Patented Dec. 29, 1925.

1,567,899

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

MOTOR VEHICLE.

Application filed August 26, 1920. Serial No. 406,187.

*To all whom it may concern:*

Be it known that I, EDWARD H. BELDEN, residing at Toledo, in the county of Lucas and State of Ohio, have invented certain new and useful Improvements in Motor Vehicles, of which I declare the following to be a full, clear, and exact description.

This invention relates to improvements in motor vehicles and in particular to improvements over the structures disclosed in my Patent No. 1,335,720 and my co-pending application, Serial Number 269,805.

In the patent referred to, I have shown supports extending upwardly from the vehicle frame upon which may be mounted such parts as the dash and the instrument board, and which may also carry the fuel tank if desired. In this patent no direct connection is shown between the support and the body of the vehicle. One of the principal objects of the present invention is the attachment of these supports to the body in such ways as to brace all of the parts thoroughly, thereby preventing relative motion between the body and the supports or the elements carried by the latter.

A further object of the invention is the utilization as bracing means of windshield brackets.

Another object is the utilization for bracing purposes of a plate or plates carried by the body and secured to the supports upon which the instrument board is mounted.

Still another object is the attainment of a further bracing effect by causing the windshield brackets to act through the windshield side posts to hold firmly the cowl which is carried by the body.

Other objects, and objects relating to details of construction and economies of manufacture, will appear as I proceed with the description of that embodiment of the invention which for the purposes of the present application I have illustrated in the accompanying drawings, in which:

Figure I is an elevation looking forward from the driver's seat, showing the instrument board, a portion of the dash with the fuel tank carried thereby, as well as the supports and windshield brackets constituting braces, certain parts being broken away and others shown in section to more clearly illustrate the invention.

Fig. II is a side elevation of a portion of the forward end of an automobile embodying my invention, certain parts being broken away and others shown in section.

Fig. III is a fragmental top plan view showing in particular the bracket braces.

Fig. IV is a section taken substantially on the line IV—IV of Figure I, showing the mounting of one of the windshield posts, together with the means for steadying and bracing the cowl.

Similar reference characters refer to like parts throughout the views.

In the drawings, 10 represents the side members of the frame of the vehicle and 11 the dust guard. Supported by the frame members 10 are the lower horizontal rails 12 of the body, which may be recessed to receive floor boards 13. 14 are the forward door posts which constitute a part of the body and which are hollow for at least a portion of their length.

Standards 15 are secured upon the frame members 10 in a position in front of the body. The standards are preferably braced by inclined bars 16 fastened at their respective ends to the standards 15 and frame members 10. I prefer to employ a bolt 17 for this connecting means at the upper end of the bar 16 and to spotweld the lower end to the frame. The bars 16 have also the additional function of supporting the toe boards 18. The standards 15 carry rearwardly extending arms 19. Both the standards and arms are preferably provided on their outer sides with flanges. Means, such as bolts 20, for securing the arms to the standards, pass through these flanges. A dash 21 is also mounted on the standards and preferably extends at its sides between the arms and standards, being provided with holes through which pass the bolts 20.

A fuel tank 22 may be supported in the dash 21. In the structure illustrated the dash is provided with an opening to fit the tank and around the opening is a flange 23 which bears tightly upon the tank and to which the latter may be secured by any suitable fastening means. The upper edge of the dash is also flanged as at 24 to provide a surface upon which the forward edge of the cowl 25 may rest. The rear edge of the latter along its sides is joined to the body in any suitable manner, as by welding to the door posts 14, while across the top it is beaded as shown at 26 for stiffening purposes and to receive the upper edge of the instrument board 27.

Plates 28 are carried by the body. They may or may not be integral with the cowl. These plates are fastened to the rear ends of the arms 19. The latter support also the instrument board 27 which, as illustrated in the drawing, is separate from the plates 28 for convenience in assembling. It will be understood, however, that these parts may be made integral if desired, without departing from the spirit of my invention, that is to say, a single element could be substituted for the instrument board 27 and the two plates 28. Fastenings 29 secure the instrument board 27 and the plates 28 to the rear ends of the arms 19. By this means a rigid connection is made between the forward end of the body and the frame through the arms 19 and standards 15.

A further connection for the same purpose consists of the windshield brackets 30 which have feet attached to the body and the arms 19 respectively. The connection of each bracket to the body is made in the hollow door post 14 where the bracket is secured by any suitable fastening means 31. At the opposite end each bracket is secured to the adjacent arm 19 preferably by bolts 32 passing through spacing washers 33.

As shown particularly in Fig. IV, the brackets are provided with sockets 34 through which pass the lower ends of windshield side posts 35 which are threaded on their lower ends to receive clamping nuts 36. The side posts 35 are formed with shoulders 37 which bear, preferably through cushions 38 of resilient material, upon the top of the cowl 25. Hence, when the nuts 36 are screwed home, the effect obtained is not only the rigid mounting of the windshield, but also the holding of the cowl against movement with respect either to the body or the frame and the consequent prevention of rattling.

By virtue of the construction herein disclosed, I obtain a rigid connection and bracing effect between the upper portion of the forward end of the body and the vehicle frame. It will be noted that at each side of the vehicle there is a triangle made up of three comparatively rigid elements, namely, the support carried by the frame, in this instance the arm 19, the windshield bracket 30 and the plate 28, the plate 28 being carried by the body, the arm 19 by the frame and the windshield bracket 30 connecting the two diagonally. Furthermore, the cowl, which is attached to the body and for some purposes may be considered a part thereof, is also connected on either side to the triangle of rigid elements. The result obtained is a substantially unitary structure preventing relative movement of the parts, which has a great advantage particularly in light weight cars where rattling is difficult to prevent.

I have herein referred to the parts 15 as standards, to the parts 19 as arms, and to the parts 30 as windshield brackets, bracket braces or braces. The parts 15 and 19 together form supports, and this term is used in a broad sense without reference to any particular apparatus which is to be carried thereby. In other words, "support" as used herein may be understood to signify means for carrying the tank alone, means for carrying a dash alone, means for carrying an instrument board alone, means for carrying any two or more of such articles or means for carrying any other apparatus which may be conveniently placed in such location upon an automobile.

I am aware that the particular embodiment of my invention herein illustrated and described is susceptible of considerable variation without departing from the spirit thereof, and therefore I desire to claim my invention broadly as well as specifically as indicated by the appended claims.

Having thus described my invention, what I claim as new and desire to secure by Letters Patent is:

1. In a motor vehicle, a frame having side members, standards rigidly mounted on said side members, a rearwardly extending arm secured to each of said standards, a vehicle body mounted upon said frame in the rear of said standards, an instrument board supported upon said arms, and a pair of windshield brackets having feet attached to said arms and body respectively.

2. In a motor vehicle, a frame having side members, standards rigidly mounted on said side members, a rearwardly extending arm secured to each of said standards, a vehicle body mounted upon said frame in the rear of said standards, an instrument board supported upon said arms, and braces connecting said arms and body respectively.

3. In a motor vehicle, a frame having side members, standards rigidly mounted on said side members, a rearwardly extending arm secured to each of said standards, a vehicle body mounted upon said frame in the rear of said standards, an instrument board supported upon said arms, and braces connecting said arms and body respectively, said braces embodying means adapted to support the side posts of a windshield.

4. In a motor vehicle, a frame having side members, supports rigidly mounted upon said side members, a dash attached to said supports, a fluid tank mounted in and supported by said dash, a vehicle body mounted upon the frame in the rear of said dash, and braces having their ends fastened to said body and supports respectively.

5. In a motor vehicle, a frame having side members, supports rigidly mounted upon said side members, a dash attached to said supports, a fluid tank mounted in and supported by said dash, a vehicle body mounted upon the frame in the rear of said dash, and a pair of windshield brackets having feet attached to said supports and body respectively to constitute bracing and securing means for the several parts.

6. In a motor vehicle, a frame having side members, supports rigidly mounted upon said side members, a dash attached to said supports, a fluid tank mounted in and supported by said dash, a vehicle body mounted upon the frame in the rear of said dash, and braces connecting said supports and body respectively, each of said braces having a socket intermediate its ends adapted to receive a side post of a windshield.

7. In a motor vehicle, a frame having side members, supports extending upwardly from and fixed to said side members, a vehicle body mounted upon the frame in the rear of the point of connection of said supports therewith, a pair of braces connecting said body and supports respectively, and a cowl, the rear end of which is secured to the body, said cowl enclosing said braces.

8. In a motor vehicle, a frame having side members, standards rigidly mounted on said side members, a rearwardly extending arm secured to each of said standards, an instrument board fastened to said arms, a vehicle body mounted upon the frame behind the standards, a pair of braces connecting said body and arms respectively, and a cowl, the rear end of which is secured to the body, said cowl enclosing said arms and braces.

9. In a motor vehicle, a frame having side members, standards rigidly mounted on said side members, a dash carried by said standards, a rearwardly extending arm secured to each of said standards, an instrument board fastened to said arms, a vehicle body mounted upon the frame behind said standards, a pair of braces connecting said body and arms respectively, and a cowl, the rear end of which is secured to said body and the front end of which rests upon said dash, said cowl enclosing said arms and braces.

10. In a motor vehicle, a frame having side members, standards rigidly mounted on said side members, a dash carried by said standards, a rearwardly extending arm secured to each of said standards, an instrument board fastened to the rear ends of said arms, a vehicle body mounted upon the frame in the rear of said arms, a pair of braces connecting said body and arms respectively, and a cowl, the rear end of which is secured to said body and the front end of which rests upon said dash, said cowl enclosing said arms and braces and the upper edge of said instrument board.

11. In a motor vehicle a frame having side members, supports extending upwardly from and rigidly mounted upon said side members, a vehicle body mounted upon the frame in the rear of said supports, a pair of windshield brackets having feet attached to said supports and body respectively to form braces therebetween, a cowl, the rear end of which is secured to said body, said cowl enclosing said brackets, and a pair of windshield side posts mounted in said brackets and extending through openings in the cowl, said posts having means for engaging the cowl around said opening when the side posts are secured in the brackets.

12. In a motor vehicle, a frame having side members, supports extending upwardly from and rigidly mounted upon said side members, a vehicle body mounted upon the frame in the rear of said supports, a pair of windshield brackets having feet attached to said supports and body respectively to form braces therebetween, a cowl, the rear end of which is secured to said body, said cowl enclosing said brackets, and a pair of windshield side posts mounted in said brackets and extending through openings in the cowl, said posts having shoulders adapted to bear upon the cowl around said opening when the side posts are secured in the brackets, and cushioning means between said shoulders and the cowl.

13. In a motor vehicle, a frame having side members, supports extending upwardly from and rigidly mounted upon said side members, a rigid connection between said supports, a vehicle body mounted upon the frame in the rear of said supports, a pair of windshield brackets having feet attached to said supports and body respectively to form braces therebetween, a cowl, the rear end of which is secured to said body, said cowl enclosing said brackets, and a pair of windshield side posts mounted in said brackets and extending through openings in the cowl, said posts having means for engaging the cowl around said openings when the side posts are secured in the brackets.

14. In a motor vehicle, a frame, supports mounted upon the frame, an instrument board carried by said supports, a body mounted upon the frame in the rear of said supports, a plate carried by said body in a position to lie against said instrument board, and means for securing said plate to said instrument board.

15. In a motor vehicle, a frame, supports mounted upon the frame, a body mounted upon the frame in the rear of said supports, and transversely extending means fastened at its ends to the body and secured to the said supports to connect and brace the parts.

16. In a motor vehicle, a frame, supports mounted upon the frame, a body mounted upon the frame in the rear of said supports, and transversely extending means fastened at its ends to the body and secured to the said supports to connect and brace the parts, said means including an instrument board.

17. In a motor vehicle, a frame, supports mounted upon the frame, a body mounted upon the frame in the rear of said supports, a transversely extending connecting means fastened at its ends to the body and secured intermediate its ends to the said supports, and a pair of braces, each secured at its respective ends to one of the supports and to the body, whereby a triangular brace connection is formed at each side between the frame and the forward end of the body.

18. In a motor vehicle, a frame, supports mounted upon the frame, a body mounted upon the frame in the rear of said supports, a transversely extending connecting means fastened at its ends to the body and secured intermediate its ends to the said support, said means including an instrument board, and a pair of braces each secured at its respective ends to one of the supports and to the body, whereby a triangular brace connection is formed at each side between the frame and the forward end of the body.

19. In a motor vehicle, a frame, supports mounted upon the frame, a body mounted upon the frame in the rear of said supports, a transversely extending connecting means fastened at its ends to the body and secured intermediate its ends to the said supports, and a pair of windshield brackets, each secured at its respective ends to one of the supports and to the body, whereby a triangular brace connection is formed at each side between the frame and the forward end of the body.

20. In a motor vehicle, a frame, supports mounted upon the frame, a body mounted upon the frame in the rear of said supports, a transversely extending connecting means fastened at its ends to the body and secured intermediate its ends to the said supports, said means including an instrument board, and a pair of windshield brackets, each secured at its respective ends to one of the supports and to the body, whereby a triangular brace connection is formed at each side between the frame and the forward end of the body.

In testimony whereof I affix my signature.

EDWARD H. BELDEN.